United States Patent [19]

Argade

[11] Patent Number: 5,032,240
[45] Date of Patent: Jul. 16, 1991

[54] METHOD OF ACTIVATION OF POROUS CARBONACEOUS ELECTRODES

[75] Inventor: Shyam D. Argade, Greensboro, N.C.

[73] Assignee: Technochem Company, Winston-Salem, N.C.

[21] Appl. No.: 329,584

[22] Filed: Mar. 27, 1989

[51] Int. Cl.$^5$ .............................................. C25F 5/00
[52] U.S. Cl. ..................................... 204/132; 204/130; 429/194; 429/199; 429/52; 429/49
[58] Field of Search ................... 429/199, 52, 194, 49; 204/132, 130, 2.1; 264/29.5

[56] References Cited

U.S. PATENT DOCUMENTS

| | | | |
|---|---|---|---|
| 4,198,382 | 4/1980 | Matsui | 423/445 |
| 4,303,744 | 12/1981 | Marincic et al. | 429/43 |
| 4,619,805 | 10/1986 | Dias et al. | 264/29.5 |
| 4,621,417 | 11/1986 | Mohri et al. | 29/623.1 |
| 4,816,289 | 3/1989 | Komatsu et al. | 423/447.3 |
| 4,835,074 | 5/1989 | Bolster et al. | 429/49 |

Primary Examiner—John F. Niebling
Assistant Examiner—Arun S. Phasge
Attorney, Agent, or Firm—Harness, Dickey & Pierce

[57] ABSTRACT

A method of activating a carbonaceous electrode is disclosed which comprises the steps of heating the electrodes to a desired temperature in water to remove surface debris from said electrodes, providing a negative electrode and a carbonaceous positive electrode spaced apart from each other, providing an aqueous electrolyte having a predetermined concentration of sulfuric acid therein and circulating the sulfuric acid solution through the porous positive electrode, passing an electrical current through the positive and negative electrodes for a predetermined time period sufficient to modify the pore structure of the positive electrode, rinsing said positive electrode, heating said electrode at a desired temperature for a desired period of time to substantially remove the activation layer and surface compound of oxygen and hydrogen on the electrode. The electrodes of the present invention are utilized in molten salt lithium-aluminum/chloride battery systems.

8 Claims, 3 Drawing Sheets

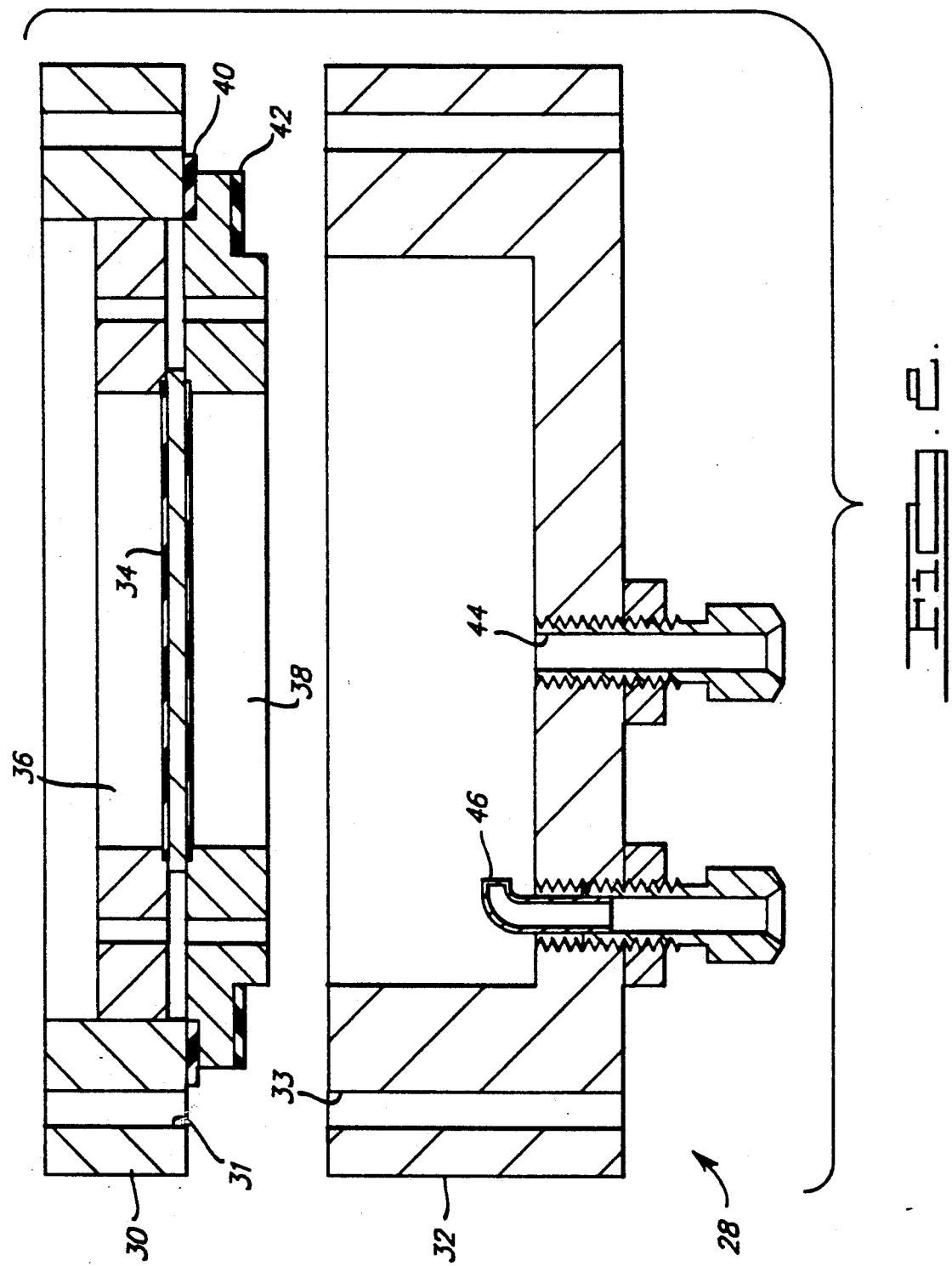

METHOD OF ACTIVATION OF POROUS CARBONACEOUS ELECTRODES

BACKGROUND AND SUMMARY OF THE INVENTION

The present invention relates generally to the conditioning of carbonaceous electrodes for electrochemical systems, and particularly to a method of activating porous graphite as halogen electrodes in a metal-halogen battery.

Electrochemical devices or systems of the type referred to herein include one or more of the metal-halogen battery systems, such as molten salt metal-chlorine battery systems, and may be applicable to other non-aqueous batteries which use carbonaceous electrodes. The metal-halogen battery systems generally are comprised of electrode stacks and other auxiliary subsystems for suitable battery operation. The battery cell is comprised of positive and negative electrodes which are both in contact with a molten salt of a suitable metal halide composition. In the lithium-aluminum/chlorine battery system, chlorine gas is liberated from the positive electrodes of the cell and may be stored either on the electrode as adsorbed chlorine or separate from the electrode stack.

With reference to the general operation of a lithium-aluminum/chlorine battery system, during charge lithium chloride - potassium chloride molten salt electrolyte is electrolyzed to form chlorine at the positive "chlorine" electrode in the cell. This chlorine electrode is typically made of a porous carbonaceous material. At the opposing negative or lithium-aluminum or lithium-alloy electrode, lithium metal is deposited which, in turn, forms an alloy' Literature cites a composition range of 10 atom % to 48 atom % of lithium in aluminum as a suitable operating range. Other lithium alloys such as lithium-aluminum-silicon, lithium-magnesium-silicon, lithium-silicon have been cited.

During the discharging of the lithium-aluminum/chlorine battery, chlorine is reduced at the chlorine electrode to chloride ions and lithium metal is oxidizied to lithium ions forming the lithium chloride salt and power is available at the battery terminals.

Over the course of the lithium-aluminum/chlorine battery charge/discharge cycle, the concentration of the electrolyte molten salt varies as a result of the electrochemical reactions occurring at the electrodes in the cell. At the beginning of charge, the concentration of lithium chloride-potassium chloride molten salt may typically be 68 mole % lithium chloride (LiCl) and 32 mole % potassium chloride (KCl). As the charging portion of the cycle progresses, the molten salt concentration will gradually decrease with the depletion of lithium and chloride ions from the molten salt. When the battery system is fully charged, the lithium chloride concentration in the molten salt will typically be reduced to 42 mole % LiCl with 58% KCl. Then, as the battery system is discharged, the electrolyte molten salt concentration will gradually swing upwardly and return to the original concentration when the battery system is completely or fully discharged.

The present invention is directed to an improved method of activating carbonaceous electrodes for primary or secondary battery systems in which a gaseous or liquid reactant is reacted at a carbonaceous electrode. The term "activating" used in this specification in connection with electrodes refers to a process of increasing the rate of the electrochemical reaction at a given overvoltage of the electrode. Similarly, the term "overvoltage" as used herein means for excess voltage above the normal reversible electrode potential of a carbonaceous electrode required to produce a desired rate of an electrochemical reaction or electrical current. In other words, by "overvoltage" is meant the difference between the electrode potential necessary to sustain an electrochemical reaction and the thermodynamic reversible electrode potential. One process for improving electrode activity is described in the Hart U.S. Pat. No. 4,120,774 entitled "Reduction of Electrode Overvoltage." This patent employs a thermal treatment of electrodes with nitric acid for a long period of time to achieve satisfactory activation. Another process for activating electrodes is described in the Carr, U.S. Pat. No. 4,273,839, entitled "Activating Carbonaceous Electrodes." This patent describes an electrolytic activation process which employs an aqueous electrolyte containing a current carrying water soluble material, and numerous examples of suitable inorganic current carrying water soluble materials are disclosed therein. The specific teachings of these patents are incorporated herein by reference.

It is a principal object of the present invention to provide an improved method of activating a carbonaceous electrode by electrolysis.

It is a more specific object of the present invention to provide a method of activating porous graphite electrodes in a metal-halogen battery cell, including a porous graphite positive electrode and a suitable negative electrode spaced apart from each other.

In order to achieve the foregoing objects, the present invention provides a novel method of activating a carbonaceous electrode, which comprises the steps of providing a negative electrode and a carbonaceous positive electrode spaced apart from each other, heating the electrodes to a desired temperature, removing surface debris from said electrodes, providing an aqueous electrolyte having a predetermined concentration of sulfuric acid therein, passing an electrical current of a predetermined current density through the positive and negative electrodes for a predetermined time period sufficient to develop an electrode pore structure so as to decrease the overvoltage of the positive electrode, rinsing said electrodes, and heating said electrodes at a desired temperature for a desired period of time to cause removal of the so-called activation layer from the electrodes.

Additional advantages and features of the present invention will become apparent from a reading of the detailed description of the preferred embodiment which makes reference to the following set of drawings in which:

BRIEF DESCRIPTION OF THE DRAWINGS

FIG. 2 is a cross-section view taken through a vertical plane of a permeability cell.

DETAILED DESCRIPTION OF THE PREFERRED EMBODIMENT

The present invention is concerned with an improved method for activating one or more carbonaceous electrodes which are to be used in an electrochemical device or system. By "carbonaceous electrodes" it is meant electrodes that are comprised of carbon, such as carbon, activated carbon, graphite, activated graphite, and mixtures thereof with other fillers that may be present in a carbonaceous electrode. One such electrochemical system in which activated carbonaceous electrodes are desirable is the lithium-aluminum/chlorine battery system. Before proceeding to describe the activation method according to the present invention, the structure of a typical lithium-aluminum/chlorine battery and an apparatus for activating the carbonaceous electrodes contained in this battery will first be described.

Figure 1:
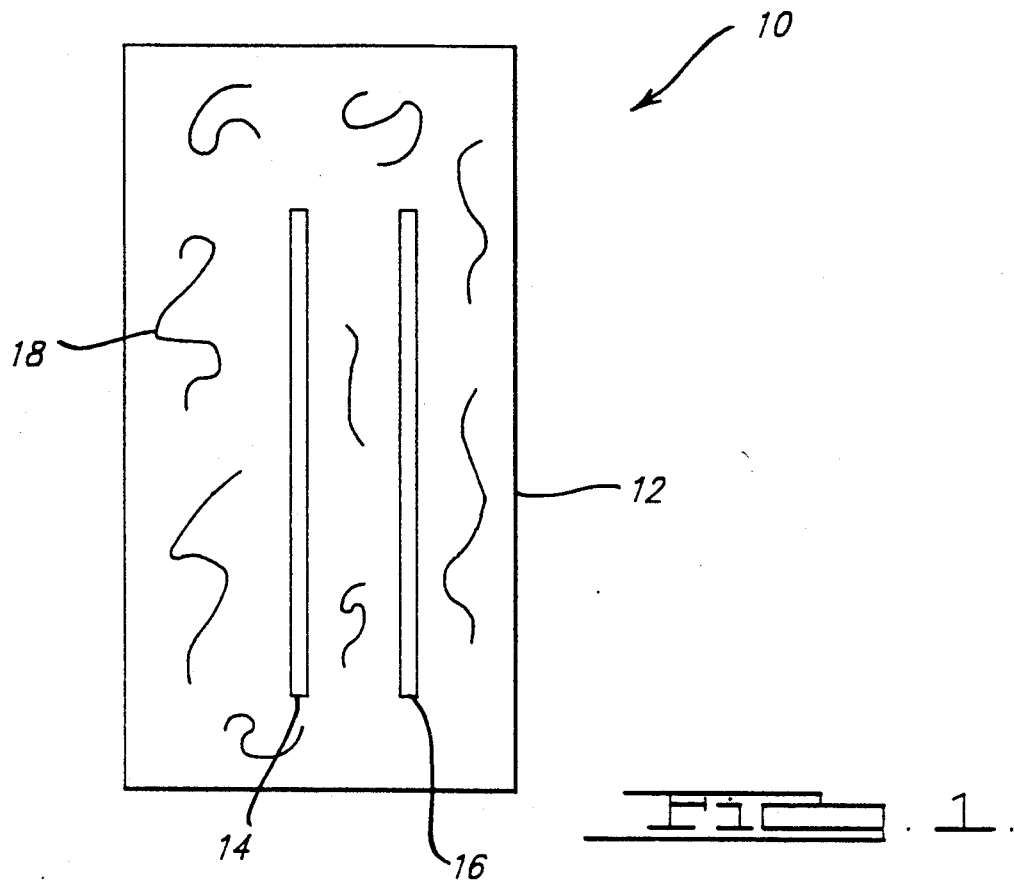
FIG. 1 is a schematic view of a lithium-aluminum/chlorine battery system.

Referring to FIG. 1, a cross-section view of a lithium-aluminum/chlorine battery assembly 10 is shown. The assembly 10 generally includes a container 12, a pair of electrodes 14 and 16 as will be described herein are in contact with a lithium chloride-potassium chloride molten salt 18. Generally, the molten salt is at a temperature of about 352° to about 500° C. during charging and discharging of the battery. The negative electrode 16 is made of a suitable lithium-aluminum alloy. The positive electrode 14 may be constructed from Union Carbide Corp. PG60 graphite, Airco Carbon Company S-1517 or 37-G, Pure Carbon Company FC-13 carbon or any other suitable carbonaceous material.

The electrodes are generally checked for permeability before use. Referring to FIG. 2, a permeability cell 28 is illustrated. The permeability cell 28 is designed to hold in place an electrode wafer 34. The cell 28 includes a pair of clamps 30 and 32 which may be held together by fasteners (not shown). The electrode wafer 34 is positioned between a pair of inner clamps 36 and 38. The inner clamps 36 and 38 are sealed by sealing members 40 and 42 when the inner clamps 36 and 38 and outer clamps 30 and 32 are clamped together. The inlets 44 and 46 in the outer clamp 32 enable nitrogen to enter the cell and access to a manometer, respectively, when the electrode wafer 34 is clamped between the two outer clamp members 30 and 32.

Prior to positioning the electrode wafer 34 in the inner clamps 36 and 38, the loose graphite debris on the electrode 34 must be removed. This is accomplished by plunging the electrode wafer 34 into a water bath after it has been heated to approximately 450° C. on a hot plate. The vigorous boiling action on the surface of the electrode removes ground in carbon debris. It is believed that two repetitions of this process will be sufficient to clean the electrodes.

Figure 3:
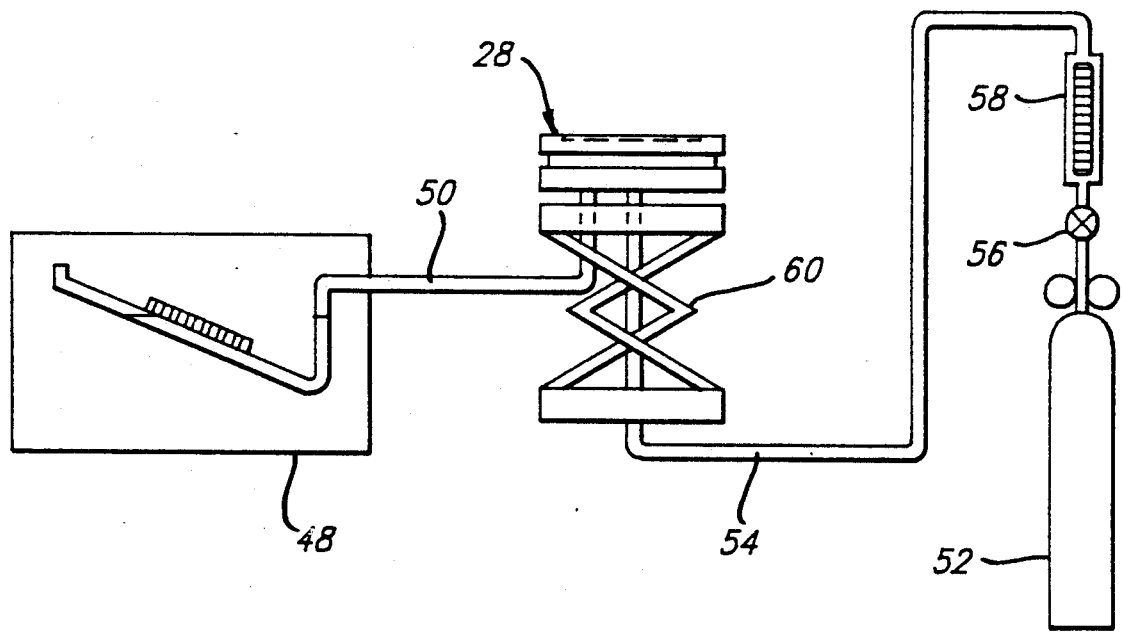
FIG. 3 is a schematic view of a permeability measuring system.

The electrode is then placed in the permeability cell 28. The permeability cell 28 enables testing of the permeability or porosity of the electrode wafer 34. As seen in FIG. 3, the inlet 46 is connected to a manometer 48 via a conduit 50. The inlet 44 is connected to a nitrogen source 52 via a conduit 54. Also a needle valve 56 and flow meter 58 are positioned in the conduit line 54. A scissors jack 60 is used to raise and lower the permeability cell 28.

The electrode is placed into the inner clamping device 36 and 38 which, in turn, is positioned into the clamping members 30 and 32. Fasteners (not shown) are inserted through the bores 31 and 33 to secure the two clamping members 30 and 32 together. The inlet 46 is connected to the incline manometer 48 and a flow rate of 2 liters/minute of nitrogen through a 62.5 cm$^2$ area of the electrode is transferred into the permeability cell 28 through inlet 44 via conduit 54. The pressure drop across the electrode 34 is read from the manometer 48. This enables a permeability coefficient to be determined for the electrode 34.

BET surface measurements may also be taken. Generally, a quantasorb surface area analyzer is used to measure the BET surface area. Basically, the measurement consists of adsorbing nitrogen from a mixture of nitrogen and helium onto the sample of carbon by immersing the tube holding the sample into liquid nitrogen. Subsequently, the sample holder is exposed to a temperature near 0° C. The amount of nitrogen adsorbed, which is proportional to the surface area of the sample, is determined from the change in the nitrogen/helium ratio in the amount of gas reaching the detector. A simple calculation with these values yields a specific surface area in square meters per gram. This value may be determined prior to or after the activation of the electrode.

Figure 4:
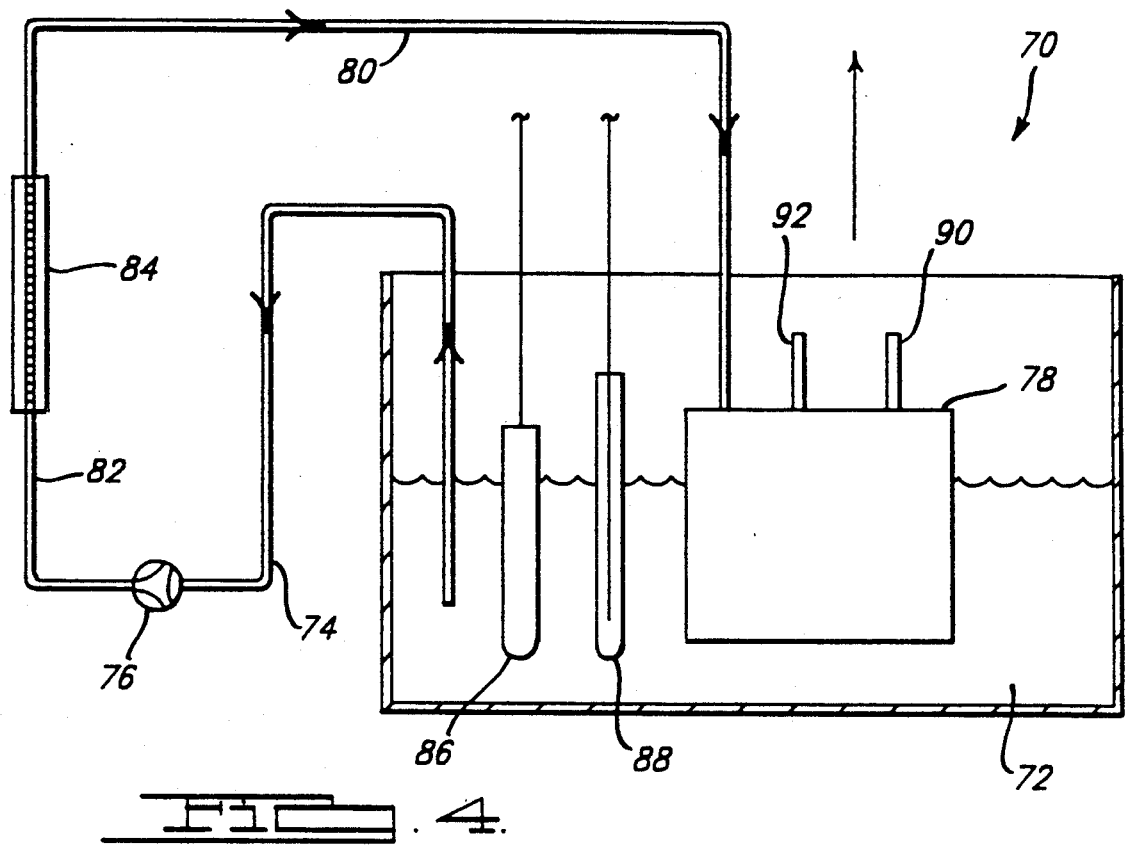
FIG. 4 is a schematic view of an apparatus which may be employed to activate the porous graphite electrodes.

Referring to FIG. 4, an apparatus 70 for activating the carbonaceous positive electrodes is illustrated. The apparatus 70 includes an aqueous sump 72 of sulfuric acid at about 0.7 molar. A conduit 74 is coupled with a pump 76 for moving fluid into the electrode cell 78 via conduit 80. Also, a conduit 82 and flow meter 84 are positioned in the conduit line between conduit 74 and conduit 80. A quartz immersion heater 86 and temperature sensor or thermocouple 88 are positioned in the sump 72. The quartz heater 86 and thermocouple 88 are coupled with a temperature controller to monitor the temperature of the electrolyte sump 72.

In accordance with the preferred activation method, the porous graphite electrodes to be activated are first assembled as the cell 78. Generally, the cell 78 is a pair of two-millimeter thick wafer electrodes as previously described. The cell 78 is positioned into the electrolyte or sump 72 in accordance with the present invention. The electrolyte is an aqueous electrolyte which contains a predetermined concentration of sulfuric acid ($H_2SO_4$). The electrolyte pump 76 is energized to circulate the aqueous electrolyte through the cell 78 at a desired rate, preferably 0.1 to two (2) milliliters/minute square cm. (ml/min.cm$^2$). A suitable source of electric power is connected across the terminals 90 and 92. The source of electrical power is then turned on or otherwise generated to cause an electrical current of a predetermined current density to pass through the positive and negative electrodes, respectively, to the cell for a predetermined time period sufficient to develop the pore structure to decrease the overvoltage of the positive electrode. Thus, electric current will flow from the positive electrode, across the electrolyte contained in the interelectrode gap electrolytically by the transfer of ions and flow through the negative electrode.

In accordance with the present invention, the predetermined time period and the predetermined current density combined to form between five (5) milliamp hours/centimeters squared (mAhr/cm$^2$) and one thousand (1,000) milliamp hours centimeters squared (mAhr/cm$^2$) of the positive electrode geometric surface area. Preferably, the predetermined time period is between one (1) and ten (10) hours, and the predetermined current density is between five (5) and fifty (50) milliamp/centimeters squared (mA/cm$^2$). The most preferred activation time is five (5) hours, and the most preferred current density is 33 milliamps/centimeter squared (mA/cm$^2$).

It has also been found that the temperature of the electrolyte has an important influence on the activation process, and it is preferred that the electrolyte temperature be maintained about 40°-60° C., and most preferably at 50° C. In prior electrolyte activation processes, it has been found that low temperature operation increases the stress placed upon the positive electrode and may result in bowing or breakage of positive electrodes. Nevertheless, in accordance with the present invention, satisfactory results may be achieved without adversely affecting the mechanical integrity or strength of the electrodes where the electrolyte temperature's maintained at 50° C.

After the appropriate activation period, the current flow through the cell 78 is terminated and the electrolyte containing sulfuric acid is drained or otherwise removed from the cell. The electrodes of cell 78 are then cleaned of any debris which may be present by rinsing in running water for about two (2) hours. A two percent (2%) sodium hydroxide (NaOH) solution is circulated through the porous graphite to remove any residual alkali soluble material. After the electrodes have been rinsed in water, they are followed by a rinse of one percent (1%) hydrochloric acid (HCl). After a final rinse in water, the electrodes are dried at room temperature and then at about 90° C.

During the above electrochemical activation process, hydrogen gas is generated at the negative electrode, while carbon is oxidized at the positive electrode. Accordingly, oxides of carbon such as carbon dioxide and carbon monoxide will be generated at the positive electrode. Some oxygen may also be generated at the positive electrode. This generation of gases at the positive electrode is indicative of the many changes which occur in the positive electrode during the activation process. For example, after activation the surface of the positive electrode typically appears darker over the active surface area than along the edges of the electrode which are generally masked. The darkness is normally uniform across the active surface area of the positive electrode and comes to an abrupt end at the line defining the masked and unmasked area. Examination of electrolytically activated graphite electrodes with the scanning electron microscope has shown that the masked or unactivated edge portion of the electrode appears flatter and more optically reflective than the darkened center or activated region. The unactivated region has fine particulate material and the graphite surface particles are obscured by the presence of surface debris. The activated region is more ordered, having particularly no fine particles, and there is little, if any, loose graphite debris. In some cases, the basal and edge planes of the graphite crystallites of the individual particles are evident. Additionally, it has been found from specific surface area measurements made on activated electrodes using modifying BET techniques that the electrolytic activation increases the specific area of the electrode by nearly an order of magnitude.

It has been found through nondestructive permeability coefficient measurements, described above, that the smaller pores of the positive electrode are enlarged. This enlarging of the pores is believed to be related to the corrosion of the graphite material during the activation process leading to the larger pores. After activation there is a substantial increase in the pore volume and the pore diameter below one micron, as determined by mercury porosimetry. Moreover, the roughening of the surface during activation may remove particulate graphite debris from the surface pores of the electrode thereby opening up blocked pores. The etching of the graphite and opening of the small and blinded pores is further evidenced by an increase of the real density. It should also be noted that this change in the properties of the positive electrode may result in a pore structure with a greater surface region available to electrochemical reaction and mass transfer. Such an increase in the available surface area would also lead to a decrease in the over potential of the electrode due to the resulting decrease in the specific current density of current flow to the electrode. The electrochemical oxidation also generates a number of surface groups such as —OH, C=O, —COOH and C—H. These groups and the moisture must be removed to make these electrodes suitable as chlorine electrodes in non-aqueous or high temperature molten salt batteries.

In accordance with the present invention, after the electrodes have been through the electrochemical activation, rinsed with water followed by a dilute sodium hydroxide two percent (2% wash) to remove alkali soluble compounds and rinsed again with tap water, the activated graphite electrodes are dried at room temperature at about 90° C. The graphite electrodes are then subjected to a heat treatment to burn off the activation layer. The heat treatment consists of slowly heating the electrodes in a stream of pure argon gas for two (2) to three (3) hours at a temperature of between 850° to 900° C. The electrodes are then cooled to room temperature in the presence of the argon gas. This treatment removes substantially all of the oxygen containing surface groups from the graphite substrate. Other treatments such as with chlorine, with this material have the same result.

Without removing the oxygen containing groups by the above treatment, these electrodes are not suitable as chlorine electrodes in a molten salt battery. Trace quantities of oxygen or moisture in electrolyte or electrodes yield completely different reactions and as a result do not yield a high cell voltage of about 3.25 to about 3.3 volts which is typical for a lithium-aluminum/chlorine battery system. Generally, once the heat treatment identified above is performed on the electrodes, the electrodes are unsuitable for aqueous metal-chlorine type battery systems.

Figure 5:
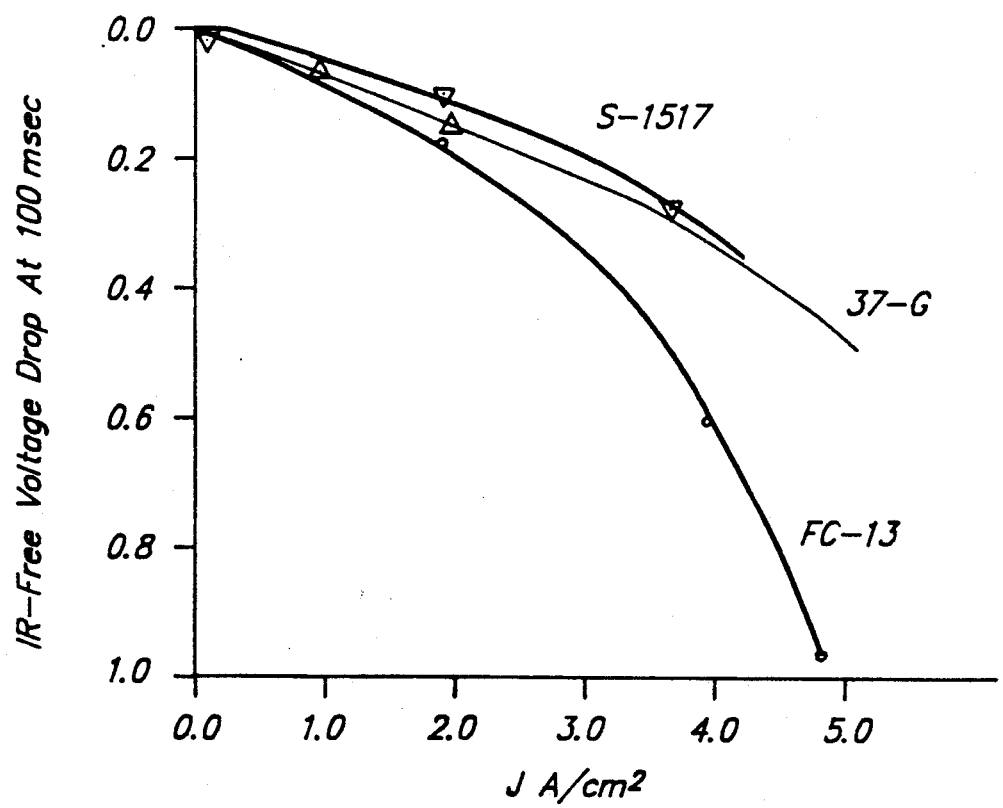
FIG. 5 is a graph of a comparison of performance of electrochemically activated S-1517 and 37-G porous graphites with that of fuel-cell grade FC-13 carbon.

The above described electrochemically activated and thermally heat treated graphite chloride electrodes, when utilized in a molten salt lithium-aluminum/chlorine battery, yield far superior results in terms of pulse power performance. Generally, the activated electrodes of relatively low surface area (approximately 5 to 6 square meters per gram m$^2$/gm) have a performance level, as shown in FIG. 5, that far surpasses a fuel cell type carbon material with a surface area of 450 square meters per gram (m$^2$/gm). This performance level is an unexpected and surprising result.

It will be appreciated that above disclosed embodiment is well calculated to achieve the aforementioned objects of the present invention. In addition, it is evident that those skilled in the art, once given the benefits of the aforegoing disclosure, may now make modifications to the specific embodiment described herein without departing from the spirit of the present invention. Such modifications are to be considered within the scope of the present invention which is limited solely by the scope and spirit of the appended claims.

What is claimed is:

1. A method of activating a carbonaceous electrode comprising the steps of:

heating the electrodes to a desired temperature and quenching in water for removing surface debris from said electrodes;

providing a negative electrode and a carbonaceous positive electrode spaced apart from each other;

providing an aqueous electrolyte having a predetermined concentration of sulfuric acid therein and circulating the sulfuric acid solution through the porous positive electrode;

passing an electrical current through said positive and negative electrodes for a predetermined time period sufficient to modify the pore structure of the positive electrode;

rinsing said positive electrode;

heating said positive electrode at a desired temperature for a desired period of time to substantially remove the activation layer and surface compounds of oxygen and hydrogen on the positive electrode.

2. The method according to claim 1 wherein said second heating further comprising heating at a temperature higher than 400° C.

3. The method according to claim 2 wherein said heating last for a period of from about 1 to about 6 hours.

4. The method according to claim 3 wherein said heating is conducted in a stream of argon gas.

5. The method according to claim 1 further comprising removing the oxygen containing surface groups from said carbonaceous electrode by reaction with chlorine.

6. A method of activating a porous graphite positive electrode for a lithium-aluminum/chlorine battery system, comprising the steps of:

heating the porous graphite positive electrode to a first predetermined temperature and quenching in water for removing surface debris from said positive electrode;

providing a negative electrode and the porous graphite positive electrode spaced apart from each other;

providing an aqueous electrolyte having a predetermined concentration of sulfuric acid therein and circulating the sulfuric acid solution through the porous positive electrode;

passing an electrical current through said positive and negative electrodes for a predetermined time period sufficient to modify the pore structure of the positive electrode;

rinsing said positive electrode;

heating said positive electrode at a second predetermined temperature in a non-oxygen containing atmosphere for a sufficient period of time to substantially remove the activation layer and surface compounds of oxygen and hydrogen on the positive electrode.

7. The method according to claim 6 wherein said second predetermined temperature is generally between 800° C. and 900° C.

8. A method of activating a porous graphite positive electrode for a lithium-aluminum/chlorine battery system, comprising the steps of:

removing surface debris from said positive electrode;

electrolytically creating an activation layer on said positive electrode in an aqueous electrolyte at a temperature generally between 40° C. and 60° C. by modifying the pore structure of said positive electrode;

cleaning said positive electrode of debris generated by said electrolytic activation step; and heating said positive electrode in a non-oxygen containing atmosphere for at least two hours at a temperature sufficiently above 500° C. to remove surface compounds of oxygen and hydrogen on said positive electrode.

* * * * *